3,193,539
PROCESS FOR POLYMERIZING VINYLIDENE
FLUORIDE
Murray Hauptschein, Glenside, Pa., assignor to Pennsalt
Chemicals Corporation, Philadelphia, Pa., a corporation
of Pennsylvania
No Drawing. Filed May 31, 1960, Ser. No. 32,591
8 Claims. (Cl. 260—87.7)

This invention relates to the polymerization of vinylidene fluoride in the presence of di-tertiary butyl peroxide as a polymerization catalyst.

The catalytic polymerization of vinylidene fluoride to high molecular weight polymers has been known for some time, being described, for example, in U.S. Patent 2,435,537. A wide variety of catalysts have been suggested for the polymerization of this monomer. Both inorganic peroxy compounds such as potassium persulfate, preferably in combination with reducing agents such as sodium bisulfite, and organic peroxides such as dibenzoyl peroxide and acetyl peroxide, have been suggested.

Of the two types of catalysts, i.e. inorganic peroxy compounds as exemplified by potassium persulfate, and organic peroxy compounds as exemplified by dibenzoyl peroxide, it has been found that the organic type of catalyst provides a higher quality polymer than the inorganic peroxy type, the organic peroxy catalysts having been found to provide polymers of considerably higher thermal stability and processability.

While the organic peroxy catalysts provide in general better polymers, catalysts of this type previously tried, such as dibenzoyl peroxide or acetyl peroxide, are known to require extremely high pressures, for example pressures of the order of 10,000 lbs./in.$^2$ to produce appreciable yields of polymer. Even at these high pressures, the yields of the polymer are often relatively poor, for example, from 10 to 20%. Because of the expensive equipment required, the cost of carrying out the polymerization at such high pressures is exorbitantly high.

In accordance with the present invention an organic catalyst has been found, namely di-tertiary-butyl peroxide of the formula

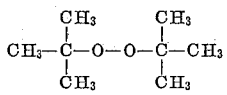

which is capable of providing excellent yields of high quality vinylidene fluoride polymer at low, commercially practicable pressures, for example of the order of 300 to 1000 lbs./in.$^2$. It appears that di-tertiary-butyl peroxide is unique among organic catalysts in providing high conversions under mild pressures since numerous attempts to obtain similar results with other organic catalysts, even catalysts as similar as tertiary-butyl hydroperoxide have been unsuccessful.

The following examples illustrate the preparation of polyvinylidene fluoride of high molecular weights using di-tertiary-butyl peroxide catalyst at moderate pressures and further illustrate the unique behavior of di-tertiary-butyl peroxide as a polymerization catalyst for vinylidene fluoride as compared to numerous other organic peroxy catalysts in common commercial use.

EXAMPLE 1

A 300 milliliter stainless steel autoclave is charged with 100 milliliters of deionized and deoxygenated water and 0.8 gram of di-tertiary-butyl peroxide. The autoclave is evacuated, cooled in liquid nitrogen and then charged with 35 grams of vinylidene fluoride ($CF_2$=$CH_2$) by gaseous transfer in vacuo. The autoclave is then sealed and placed in an electrical heating jacket mounted on a horizontal shaking apparatus and held at 122° to 124° C. for 18½ hours. A maximum pressure of about 800 lbs./in.$^2$ gage is reached after the first 2 hours of heating and the pressure then decreases as the polymerization proceeds.

After the reaction period, the autoclave is cooled, vented and opened. The contents consist of precipitated polyvinylidene fluoride suspended in a liquid phase having a pH of 2.5. The polymer is vacuum filtered and washed on the filter funnel with methanol, then washed ten times with distilled water, and given a final wash with methanol. It is then dried in a vacuum oven at 102° C. The washed, dried polymer weighs 29 grams, representing an 83% conversion of the monomer to polymer. The polymer, which melts at 160 to 165° C. has a high molecular weight as indicated by its plasticity number of 3020. The "plasticity number" is an empirical index indicating relative molecular weight of vinylidene fluoride polymers. Because of the difficulty of obtaining a true solution of the polymer absolute molecular weight determinations have not been possible to obtain. The plasticity number is the area in square millimeters of a plaque made by placing 0.5 grams of polymer powder piled in a cone between the platens of a Carver press heated at 225° C. The platens are brought together to compress the powder under slight pressure (less than 50 lbs./in.$^2$) between the heated platens and the powder is preheated in this manner at 225° C. for 30 seconds. A pressure of 2500 lbs./in.$^2$ is then applied for sixty seconds at platen temperature of 225° C. The greater the area of the plaque so produced, the lower the molecular weight of the polymer and conversely.

The polymer likewise has excellent thermal stability. It does not decompose when heated to 320° C. and shows substantially no discoloration when exposed in a circulating air oven for 100 hours at 200° C. It has good low temperature properties as shown in a test in which the polymer is flexed 180° over a ⅛" mandrel at —70° C. without breaking.

EXAMPLE 2

A 300 milliliter stainless steel autoclave is charged with 100 milliliters of deionized and deoxygenated water and 0.6 gram of di-tertiary-butyl peroxide after which the autoclave is evacuated, cooled in liquid nitrogen and charged with 35 grams of vinylidene fluoride by gaseous transfer in vacuo. The autoclave is then sealed and heated while shaking as in Example 1 for 16 hours at 122° to 123° C. The maximum pressure is about 800 lbs./in.$^2$ gage.

The autoclave is cooled, vented and opened. The contents consist of precipitated polymer in a liquid phase which has a pH of 2.35. The polymer is filtered, washed and dried as in Example 1, the washed, dried polymer weighing 28.3 grams, representing a conversion of 80% based on the monomer. The polymer has a plasticity number of 3600 and other properties similar to the polymer of Example 1.

EXAMPLE 3

A 300 milliliter stainless steel autoclave is charged with 100 milliliters of deionized and deoxygenated water and 0.3 gram of di-tertiary-butyl peroxide after which the autoclave is evacuated and placed in an electrical heating jacket mounted on a shaking device and connected to a cylinder of vinylidene fluoride under pressure by stainless steel tubing. The autoclave is heated to 123° C. and opened to the vinylidene fluoride cylinder after which the autoclave is maintained at a constant pressure of 595 lbs./in.$^2$ gage over a period of 21 hours while maintaining the autoclave temperature at 125°±2° C.

After the reaction period the autoclave is cooled, vented and opened. The precipitated polymer is vacuum filtered, washed and dried as in Example 1. 25 grams of washed, dried polyvinylidene fluoride is obtained representing a conversion rate of 1.2 grams of polyvinylidene fluoride per hour per 100 milliliters of water in the polymerization recipe. The polymer is of high molecular weight and has a plasticity number of 1260 and other properties similar to the polymers obtained in Examples 1 and 2.

The following Examples 4 to 21 inclusive illustrate the results obtained in a series of runs under substantially the same conditions as Examples 1 to 3 using numerous other organic peroxy catalysts. Table 1 below summarizes these runs. In each case a 300 milliliter stainless steel autoclave is charged with deoxygenated, deionized water together with the organic peroxy catalyst after which vinylidene fluoride is introduced into the autoclave followed by heating at the indicated temperature and pressure for reaction periods of from about 16 to 19 hours. Temperatures of from 65° to 150° C. are employed depending upon the optimum temperature for the particular catalyst.

mer of high molecular weight (plasticity number about 3600) and then only in a conversion of 11.1%.

As pointed out previously, the polymer obtained with a di-tertiary-butyl peroxide catalyst is markedly superior in thermal stability and processability to the type of polymer obtained using an inorganic peroxy compound, such as potassium persulfate or ammonium persulfate, as a catalyst. This superiority is illustrated by the following tests. In these tests, Polymer A is a polymer prepared in accordance with the procedures of Example 1 using a di-tertiary-butyl peroxide catalyst, while Polymer B is a polymer prepared by polymerizing vinylidene fluoride in the presence of a persulfate catalyst, the following polymerization procedure being typical of that used for the preparation of Polymer B:

A 300 milliliter stainless steel autoclave is charged with 100 parts of deoxygenated deionized water, 1½ parts of sodium pyrophosphate ($Na_4P_2O_7 \cdot 10H_2O$), 1 part of potassium persulfate ($K_2S_2O_8$); one-half part of sodium sulfite ($Na_2SO_3$); after which the autoclave is evacuated, and charged with vinylidene fluoride at a pressure of 400 to 600 lbs./in.$^2$ gage and heated at 80° C. for a period

*Table I*

| Example No. | Catalyst | Amount of catalyst | Grams $CF_2=CH_2$ | Ml. $H_2O$ | Temp., °C. | Max. pressure, p.s.i.g. | Reaction time, hours | Conversion wt. percent on monomer |
|---|---|---|---|---|---|---|---|---|
| 4 | Benzoyl peroxide | 0.4 gm | 35 | 100 | 80 | 600 | 17½ | 0 |
| 5 | do | 0.4 gm | 35 | 100 | 100 | 500 | 17½ | 0 |
| 6 | do | 0.15 gm | 59.5 | (¹) | 80 | 13,800 | 18 | 11.1 |
| 7 | Tertiary-butyl hydroperoxide | 1.0 gm | 35 | 100 | 150 | 840 | 16½ | 0 |
| 8 | do | 1.0 gm | 35 | 100 | 120 | 800 | 17 | 0.8 |
| 9 | Tertiary-butyl perbenzoate | 0.5 gm | 35 | 100 | 125 | 800 | 17½ | 0.8 |
| 10 | Tertiary-butyl peracetate | 1 ml.² | 35 | 100 | 120 | 750 | 17 | 17 |
| 11 | do | 0.5 ml.² | 35 | 100 | 120 | 700 | 17 | 13.4 |
| 12 | Acetyl peroxide | 1.5 ml | 31.6 | 100 | 100 | 600 | 19 | 0 |
| 13 | 2,4-dichlorobenzoyl peroxide | 1 gm | 35 | 100 | 65 | 660 | 17 | 0 |
| 14 | Disuccinic acid peroxide | 0.4 gm | 35 | 100 | 82 | 680 | 18 | 0 |
| 15 | Cumene hydroperoxide | 0.7 gm | 35 | 100 | 80 | 740 | 18 | 0 |
| 16 | Dicumyl peroxide | 0.6 gm | 30 | 100 | 100 | 590 | 18 | 0 |
| 17 | Lauroyl peroxide | 0.9 gm | 35 | 100 | 80 | 630 | 18 | 0 |
| 18 | Methyl ethyl ketone peroxide | 0.6 gm | 35 | 100 | 120 | 880 | 17 | 0 |
| 19 | Di(hydroxyheptyl)peroxide | 0.5 gm | 35 | 100 | 100 | 800 | 17½ | 0 |
| 20 | Myristoyl peroxide | 0.6 gm | 35 | 100 | 80 | 550 | 18 | 0 |
| 21 | α,α'azobis-isobutyronitrile | 0.5 gm | 35 | 100 | 80 | 670 | 17½ | 0.8 |

[1] Water was injected into the reactor to give a pressure of 12,000–14,000 lbs./in.$^2$ per 1¾ hour. The pressure then gradually dropped to 10,000 lbs./in.$^2$ over the reaction period.
[2] Iron powder .0007 gm.

It will be noted that at moderate pressures of from 500–900 lbs./in.$^2$ gage at which di-tertiary-butyl peroxide gives excellent conversions of the monomer to high quality polymer, the catalysts used in Examples 4 to 21, even catalysts as closely related as tertiary-butyl hydroperoxide, tertiary-butyl perbenzoate and tertiary-butyl peracetate give no measurable conversions or at best poor conversions of the monomer to polymer. The only catalyst that gave any significant conversion to polymer at moderate pressures, namely tertiary-butyl peracetate (Examples 10 and 11) gave polymers of poor quality, the polymers being brittle and of low molecular weight as shown by their high plasticity numbers, these being in both cases much in excess of 5000.

Only Example 6 in which benzoyl peroxide was employed at a pressure of 13,800 lbs./in.$^2$ gage gave a polyof to 5 to 10 hours. The polymer is obtained in the form of a suspension which can be isolated by filtration.

By varying the amount of catalyst and/or the reaction temperature, polymers of varying molecular weight (as shown by their plasticity numbers) were obtained both with the di-tertiary-butyl peroxide and the persulfate catalyst. In general, the higher the temperature and the higher the concentration of the catalyst, the lower is the molecular weight (and the higher the corresponding plasticity number) of the polymer.

Clear, colorless compression molded films of Polymer A and Polymer B of varying plasticity numbers were cut into strips about one-half inch wide and placed into a forced draft oven at 200° C. for sixteen hours, the appearance of the strip being observed at the end of four hours and at the end of 16 hours with the following results which are tabulated in Table II.

*Table II*

| | Plasticity #1800 | | Plasticity #2700 | | Plasticity #5000 | |
|---|---|---|---|---|---|---|
| | 4 hours | 16 hours | 4 hours | 16 hours | 4 hours | 16 hours |
| Polymer A | Colorless, no change. | Colorless, no change. | Very slightly yellow. | Light yellow. | Very slightly yellow. | Light yellow. |
| Polymer B | Brown. | Dark brown. | Brown. | Dark brown. | Brown. | Dark brown. |

In another test for thermal stability similar clear, colorless strips of compression molded film of Polymer A and Polymer B each having a plasticity number of 2100 were placed in an oven at 150° C. for six months. At the end of this time Polymer A had turned only very slightly yellow while Polymer B had turned dark brown.

Since for many applications, such as extrusion and injection molding, the polymer must be fabricated somewhat above its melting temperature, namely at temperatures of about 200° C., the higher thermal stability at these temperatures of the polymers produced by the organic peroxide of the invention is a salient advantage over polymers produced by inorganic peroxy compounds. These latter tend to darken rapidly when heated to temperatures necessary for such operations as extrusion and injection molding which makes it difficult or impossible to fabricate these more thermally sensitive polymers by these techniques. Polymers produced in accordance with the invention on the other hand may be readily processed at their melting temperatures by injection molding, extrusion and similar operations with no detectable discoloration or darkening.

The polymerization of vinylidene fluoride in the presence of di-tertiary-butyl peroxide may be carried out at temperatures at which this catalyst forms free radicals, such temperatures generally ranging from 100° to 150° C. and preferably from 105° to 135° C. In general, other conditions being the same, temperatures above about 150° C. tend to produce polymers of lower molecular weight, while at temperatures below 100° C. the conversion rates fall off rather rapidly.

The polymerization should be carried out under superatmospheric pressures of at least about 200 lbs./in.$^2$ gage. While there is no critical upper limit in the pressure that may be employed (for example pressures as high as 20,000 lbs./in.$^2$ and more may be employed if desired) it is a highly advantageous feature of the invention that higher pressures are not required in order to obtain excellent conversions. Generally, little advantage will be obtained in polymer quality or conversion by operating above 2000 lbs./in.$^2$ gage, and in most cases, the optimum operating pressure from the standpoint of obtaining good conversion rates with the use of equipment of moderate cost will lie in the range of from 300 to 1200 lbs./in.$^2$ gage.

The amount of di-tertiary-butyl peroxide employed in the polymerization recipe may vary widely depending upon other polymerization conditions and the desired molecular weight of the polymer. As little as 0.005% for example to as much as 10% by weight may be used based on the total weight of monomer employed in a given run. The optimum concentration of catalyst will depend upon the polymerization technique and polymerization conditions employed, but usually will lie in the range of from 0.05% to 5% and most desirably from .05% to 2% by weight based on total monomer. Other conditions being the same, the use of relatively large amounts of catalyst, e.g. amounts greater than about 5% by weight based on total monomer employed tend to favor the production of lower molecular weight polymers.

One preferred technique for carrying out the polymerization involves the use of an inert liquid reaction medium, which is preferably deoxygenated, deionized water. The deoxygenated deionized water is first charged to the reactor together with the di-tertiary-butyl peroxide after which the air in the reactor is evacuated or swept out with an inert gas. The reactor is then charged with vinylidene fluoride under pressure. The reaction may be carried out either in a batch operation wherein a given charge of vinylidene fluoride is sealed in the reactor under pressure, heated at reaction temperature, and the reactor then opened to recover the polymer, or the reaction may be carried out continuously under constant pressure by connecting the reactor to a source of vinylidene fluoride under pressure such that the fresh vinylidene fluoride feed enters the reactor as conversion to the polymer occurs. Where the monomer is fed into the reactor continuously during the run, the full amounts of liquid medium, catalyst, and if desired auxiliary materials such as surfactants or buffers, for the entire run may be loaded into the reactor at the beginning of the run, or alternatively one or more of these materials may be injected continuously or semi-continuously into the reactor as the run proceeds. During the reaction period, the reactor contents are preferably agitated such as by an internal agitator or by shaking or rocking the reactor as a whole.

When an aqueous reaction medium is used, it is often desirable to employ buffering agents to control the pH of the water which in the absence of a buffer tends to decrease from an initial pH of about 7 to a pH on the acid side of e.g. from 2.0 to 3.5 during the reaction. In the presence of buffering agents such as sodium pyrophosphate ($Na_4P_2O_7$), dibasic sodium phosphate ($Na_2HPO_4$), sodium borate, sodium carbonate, sodium oxalate, etc., the aqueous medium is maintained essentially neutral which helps prevent corrosion of the reactor. The following example illustrates the polymerization of vinylidene fluoride in an aqueous medium employing a buffering agent and a di-tertiary-butyl peroxide catalyst:

EXAMPLE 22

A 300 milliliter stainless steel autoclave is charged with 100 milliliters of deionized and deoxygenated water, 1.5 grams of ($Na_4P_2O_7 \cdot 10H_2O$) and 0.5 gram of di-tertiary-butyl peroxide. The autoclave is then evacuated, and connected to a source of vinylidene fluoride at a pressure of 660 lbs./in.$^2$ gage after which the autoclave is heated at a temperature of 123° C. for 17 hours while maintaining autoclave pressure at 660 to 700 lbs./in.$^2$ gage. The autoclave is then cooled, vented and opened. The polymer is suspended in the aqueous phase which has a pH of 7.3. The polymer is filtered, washed and dried as described in Example 1. It has properties similar to the polymers prepared in Examples 1 to 3.

In aqueous medium polymerization, it has also been found desirable to add a surfactant to the polymerization recipe. A particularly suitable class of surfactants are those of the formula AB where A is a highly fluorinated or highly fluorochlorinated hydrophobic group having 6 to about 20 carbon atoms, and preferably from 8 to about 15 carbon atoms, while B is an ionic hydrophilic (i.e. water solubilizing) group. Examples of such surfactants are perfluorocarboxylic acids or their water soluble salts such as perfluorooctanoic acid, perfluorononanoic or perfluorodecanoic acid, and the alkali metal or ammonium salts thereof; the omega hydro perfluorocarboxylic acids, namely those of the general formula $H(CF_2)_nCOOH$ where $n$ is an integer from 5 to about 20 such as $H(CF_2)_8COOH$ or the water soluble salts thereof; perfluorochlorocarboxylic acids or their water soluble salts such as $Cl(CF_2CFCl)_3CF_2COOH$;

$$CF_2ClCCl_2(CF_2CFCl)_2CF_2COOH$$
$$CF_3CCl_2(CF_2CFCl)_2CF_2COOH$$

or the alkali metal or ammonium salts thereof.

Instead of the carboxylic acid group, other water solubilizing groups, such as a sulfate, phosphate, amine, or sulfonic acid group may be employed. For example perfluorooctane sulfonic acid $F(CF_2)_8SO_3H$; perfluoro[dimethylcyclohexyl] sulfonic acid $$(CF_3)_2[cyclic\text{-}C_6F_9]SO_3H$$

perfluoro[ethylcyclohexyl] sulfonic acid $$C_2F_5[cyclic\text{-}C_6F_{10}]SO_3H$$

or their alkali metal or ammonium salts may be employed.

The concentration of the surfactant is not critical but it is generally used in minor amounts ranging from 0.005% to 3% by weight based on the weight of the water used, and preferably from 0.01% to 0.5%.

When surfactants of these types are employed, the polymer is generally obtained in a more desirable physical form, e.g. as a dispersion or latex which may be coagulated to form an easily handled free flowing powder. The use of a surfactant also improves reproducibility and control of polymerization results and tends to give a polymer of better physical properties.

The following examples illustrate the use of various surfactants to produce a latex in which most of the particles are of colloidal dimensions:

EXAMPLE 23

A 2 gallon stainless autoclave is charged with 6356 grams of deoxygenated deionized water, 9 grams of di-tertiary-butyl peroxide and 4.0 grams of perfluorooctanoic acid $F(CF_2)_7COONH_4$. The autoclave is then connected to a cylinder of vinylidene fluoride at a pressure of 650 lbs./in.$^2$. Vinylidene fluoride monomer is admitted continuously over a period of 4 hours while maintaining the reaction temperature at 115° C. with continuous agitation of the autoclave contents by an internal agitator. From this reaction there is recovered approximately 7500 grams of a latex containing 13.4% solids. The latex is coagulated by the addition of 400 milliliters of a 10% sodium chloride solution while stirring at a moderate rate. The coagulated latex is filtered and washed with water and then dried to produce approximately 1000 grams of vinylidene fluoride homopolymer in the form of a fine white powder having a plasticity of 1700 and excellent thermal stability.

EXAMPLE 24

Example 23 is repeated under substantially identical conditions except that the amount of di-tertiary-butyl peroxide is increased to 12 grams. This results in a polymer having a somewhat higher plasticity (viz. 2300) and a correspondingly lower molecular weight.

EXAMPLE 25

Example 23 is repeated under substantially identical conditions except that 11 grams of di-tertiary-butyl peroxide is employed giving a polymer having a plasticity of 2100.

EXAMPLE 26

A 2 gallon stainless steel autoclave is charged with 6300 grams of deoxygenated deionized water; 10 grams of di-tertiary-butyl peroxide; and 4.0 grams of the potassium salt of perfluorooctane sulfonic acid $F(CF_2)_8SO_3K$. The autoclave is connected with a source of vinylidene fluoride at a pressure of 650 lbs./in.$^2$ and vinylidene fluoride monomer is fed into the autoclave continuously over a period of 2¾ hours at a reaction temperature of 120° C. with continuous agitation of the autoclave contents. Approximately 7500 grams of a latex are recovered having a solids content of 13.6%. The latex is coagulated, washed and dried in substantially the same manner as described in Example 23 to produce approximately 1000 grams of polymeric vinylidene fluoride in the form of a fine white powder having a plasticity of 2050.

EXAMPLE 27

The procedure of Example 26 is repeated under substantially identical conditions except that 8 grams of di-tertiary-butyl peroxide is used. A polymer of lower plasticity (viz. 1800) and correspondingly higher molecular weight is obtained.

EXAMPLE 28

A 2 gallon stainless steel autoclave is charged with 6300 grams of deoxygenated deionized water; 8 grams of di-tertiary-butyl peroxide; and 6.0 grams of the potassium salt of perfluoro(dimethylcyclohexyl) sulfonic acid $$[(CF_3)_2(cyclic\text{-}C_6F_9)SO_3K]$$

The autoclave is connected to a source of vinylidene fluoride under pressure of 650 lbs./in.$^2$ and vinylidene fluoride monomer is fed continuously to the autoclave over a period of 2½ hours while maintaining reaction temperature of 120° C. with continuous agitation of the autoclave contents. Approximately 7500 grams of a latex is obtained containing 13.6% solids. The latex is coagulated, filtered and washed substantially as described in Example 23 to produce 1000 grams of polymeric vinylidene fluoride in the form of a fine white powder having a plasticity of 1800.

EXAMPLE 29

Example 28 is repeated under substantially identical conditions except that 2.0 grams of the surfactant is employed. A polymer of similar properties is obtained.

EXAMPLE 30

A 2 gallon stainless steel autoclave is charged with 6356 grams of deoxygenated deionized water; 10.5 grams of di-tertiary-butyl peroxide; and 5.0 grams of the ammonium salt of a perfluorochlorocarboxylic acid of the formula $CF_2ClCCl_2CF_2CFClCF_2COONH_4$. The autoclave is connected to a source of vinylidene fluoride at 650 lbs./in.$^2$ and vinylidene fluoride monomer is introduced continuously into the autoclave over a period of 2 hours and 40 minutes while maintaining a reaction temperature of 115° C. with continuous agitation of the autoclave contents. Approximately 7500 grams of latex is recovered which is coagulated, filtered and washed as in Example 23. Polymeric vinylidene fluoride is recovered as a fine white powder having a plasticity of 2400.

EXAMPLE 31

A 2 gallon stainless autoclave is charged with 6356 grams of deoxygenated deionized water; 10.5 grams of di-tertiary-butyl peroxide; and 5.0 grams of the ammonium salt of a perfluorochlorocarboxylic acid of the formula: $CF_2ClCCl_2(CF_2CFCl)_2CF_2COONH_4$. The autoclave is connected to a source of vinylidene fluoride under a pressure of 650 lbs./in.$^2$ and monomeric vinylidene fluoride is passed continuously into the autoclave during a period of 3¼ hours while maintaining a reaction temperature of 115° C. Approximately 7500 grams of latex is recovered having a solids content of 13.1%. The latex is coagulated, filtered and dried as described in Example 23 to produce approximately 1000 grams of polymeric vinylidene fluoride in the form of a white, free flowing powder having a plasticity of 2100.

A second preferred technique for carrying out the polymerization in the presence of di-tertiary-butyl peroxide is simply to introduce the catalyst, together with vinylidene fluoride monomer under pressure into a reactor and to heat, at temperatures ranging from 100° to 150° C. and preferably from 110° to 135° C. When using such a technique, it has been found that the polymer is obtained in the form of a dry, white fluffy powder which is easily removed from the reactor. Use of this technique has the advantage of requiring no inert liquid medium such as deionized, deoxygenated water, the omission of which in turn eliminates the need for buffers, surfactants and the like which are often desirable when polymerizing in the presence of an aqueous medium. This technique is also advantageous in that it lends itself readily to a continuous operation wherein the reactor is connected to a source of vinylidene fluoride under pressure such that fresh vinylidene fluoride feed enters the reactor as conversion to the polymer occurs. If desired, during the course of the polymerization, additional catalyst may be injected continuously or at intervals to replace that consumed as the reaction proceeds.

The following examples illustrate the polymerization of vinylidene fluoride using this technique:

EXAMPLE 32

A 235 milliliter stainless steel autoclave is charged with 3 grams of di-tertiary-butyl peroxide, after which the autoclave is evacuated and then charged with 33 grams of vinylidene fluoride by gaseous transfer in vacuo. The autoclave is then sealed and heated at a temperature of 140° C. for 140 hours. The initial pressure in the autoclave of 450 lbs./in.$^2$ gage rises to a maximum of 800 lbs./in.$^2$ gage during the reaction. The autoclave is vented and opened and 17.5 grams of polymer having a melting point of 145 to 155° C. is recovered amounting to a conversion of 53% based on the monomer.

EXAMPLE 33

A 235 milliliter stainless steel autoclave is charged with 3 grams of di-tertiary-butyl peroxide and then evacuated and charged with 38 grams of vinylidene fluoride. The autoclave is then sealed and heated at 135° C. for 60 hours. Upon venting and opening the autoclave, 20.7 grams of polyvinylidene fluoride is recovered having a melting point of 148 to 155° C. The conversion based on the monomer is 53%.

EXAMPLE 34

A 300 milliliter stainless steel autoclave is charged with 0.4 gram of di-tertiary-butyl peroxide and 50 grams of vinylidene fluoride by gaseous transfer in vacuo after which the autoclave is sealed and heated with shaking for 16 hours at 125° C. A maximum pressure of 840 lbs./in.$^2$ gage decreases to a pressure of 460 lbs./in.$^2$ gage at the end of the reaction period. The autoclave is vented and opened. The polymer is recovered as a fluffy white powder from the walls and bottom of the autoclave. After washing with water filtering and drying in an oven at 70° C., 39.9 grams of polymer is obtained amounting to an 80% conversion based on monomer. The polymer has a plasticity number of 4780.

EXAMPLE 35

A 300 milliliter stainless steel autoclave is charged with 0.2 gram of di-tertiary-butyl peroxide and 50 grams of vinylidene fluoride by gaseous transfer in vacuo after which the autoclave is sealed and heated while shaking at 120° C. for 16½ hours. The maximum pressure reached in the reaction is 620 lbs./in.$^2$ gage. The autoclave is vented and opened and the polymer is collected as a white fluffy powder collected at the bottom of the autoclave and present also as a layer on the walls of the autoclave which is easily removed. After heating the polymer in an oven at 70° C. for about 15 hours, 13.8 grams of polymer is obtained amounting to a conversion of 27.6% based on the monomer. The polymer is of excellent properties having a plasticity number of 2500.

EXAMPLE 36

A 300 milliliter stainless steel autoclave is charged with 0.1 gram of di-tertiary-butyl peroxide and 35 grams of vinylidene fluoride by gaseous transfer in vacuo after which the autoclave is sealed and heated with shaking at 130° C. for 16 hours. A maximum pressure of 590 lbs./in.$^2$ gage is reached during the reaction period. The autoclave is vented and opened and the polymer recovered as a white, fluffy powder. After heating in a vacuum oven for approximately 5 hours, 13.4 grams of polymer is obtained amounting to a conversion of 38.4% based on monomer. The polymer is of excellent quality having a plasticity number of 2900.

EXAMPLE 37

A 300 milliliter stainless steel autoclave is charged with 0.1 gram of di-tertiary-butyl peroxide after which the autoclave is evacuated and then connected by stainless steel tubing to a cylinder of vinylidene fluoride under pressure. The autoclave is heated without shaking for 17½ hours at a temperature of 130° C. while maintaining the pressure in the autoclave constant at about 580 lbs./in.$^2$ gage. Upon venting the autoclave at the end of this reaction period the polymer is recovered as a fluffy white solid. After drying the polymer in a vacuum oven overnight at about 70° C., 40.3 grams of polymer is recovered having a plasticity of about 2700. The rate of conversion is 0.77 gram of polymer per hour per 100 cc. of autoclave volume.

It is apparent from the foregoing that the unique activity of di-tertiary-butyl peroxide as a catalyst for the polymerization of vinylidene fluoride makes possible the preparation of homo-polymers of vinylidene fluoride of excellent properties under practicable polymerization conditions. Similar advantages accrue when polymerizing mixtures consisting essentially of vinylidene fluoride but containing small amounts, viz. up to about 5 mole percent of other ethylenically unsaturated comonomers such as ethylene or haloethylenes, e.g. $CFCl=CFCl$, $CF_2=CFCl$, $CF_2=CFH$ or $CF_2=CF_2$, and the polymerization of such mixtures containing 95 mole percent or more of vinylidene fluoride is also included within the scope of the invention.

By proper choice of conditions, as explained above, polymers having a wide range of molecular weights, varying from high molecular weight polymers having plasticity numbers of from 1000 to 3500 to relatively low molecular weight polymers having plasticity numbers greater than 5000 may be obtained. The high molecular weight polymers having plasticity numbers of from 1500 to 3000 are particularly useful. Such polymers are characterized by melting temperatures of approximately 150 to 170° C. They have high thermal stability and are strong and tough. They have high resistance to attack by a wide variety of chemical reagents; they are substantially insoluble in such solvents as acetic acid, ethanol, ethyl acetate, ethylene dichloride, heptane, carbon tetrachloride, toluene, water, trichloroethylene, isooctane, trichloroacetic acid, formamide, methyl hexyl ketone, motor oil at 50° C. They resist attack at ordinary temperatures by such reagents as hydrochloric, sulfuric, and nitric acids at all concentrations, inorganic salt solutions, inorganic bases such as sodium hydroxide and ammonium hydroxide, alcohols, alkanes, organic acids, esters, aromatic hydrocarbons, chlorinated hydrocarbons, etc.

The higher molecular weight polymers are particularly suitable for fabrication into fibers and films, such as by melt extrusion, which may be oriented to high strengths. Such polymers likewise may be extruded into various shapes such as rods and tubes; they may be compression molded or injection molded into any desired shape to form, e.g. gaskets, gears, valve bodies and valve parts, pulleys, etc. For such applications, a wide variety of plasticizers, fillers, pigments, etc. may be incorporated with the polymer.

The polymers of the invention are likewise useful for the formation of protective coatings from organic or aqueous dispersions of the polymer, such coatings being easily applied such as by spraying, brushing, or dipping and having excellent thermal stability and chemical resistance.

The lower molecular weight polymers, having plasticity numbers greater than 5000 are useful e.g. as waxes, potting compositions, waterproof coatings, impregnants, protective coatings etc.

This application is a continuation-in-part of my copending application Serial No. 812,796, filed May 13, 1959, for Polymerization Process, now abandoned, which in turn is a continuation-in-part of my application Serial No. 585,170, filed May 16, 1956, for Polymerization of Vinylidene Fluoride, now United States Patent 3,012,021, issued December 5, 1961.

I claim:

1. A method for the production of vinylidene fluoride homopolymers which comprises subjecting vinylidene fluoride to homopolymerization in the presence of di-tertiary-butyl peroxide as a polymerization catalyst at pressures ranging from 200 to 2,000 lbs./in.² and at temperatures of from 100 to 150° C.

2. A method for the production of vinylidene fluoride homopolymers which comprises subjecting vinylidene fluoride to homopolymerization in the presence of from .05 to 5 percent by weight, based on the weight of total monomer, of di-tertiary-butyl peroxide as a polymerization catalyst at pressures ranging from 200 to 2,000 lbs./in.² at temperatures of from 100 to 150° C.

3. A method for the production of vinylidene fluoride homopolymers which comprises subjecting vinylidene fluoride to homopolymerization in the presence of di-tertiary-butyl peroxide as a polymerization catalyst in the presence of an aqueous reaction medium and in the presence of a surfactant at pressures ranging from 200 to 2,000 lbs./in.² and at temperatures of from 105° to 135° C.

4. A method in accordance with claim 3 in which said surfactant is a compound having a water solubilizing group and a hydrophobic group selected from the class consisting of highly fluorinated and highly fluorochlorinated groups having from 6 to 20 carbon atoms.

5. A method for the production of vinylidene fluoride homopolymers which comprises subjecting vinylidene fluoride to homopolymerization in the presence of di-tertiary-butyl peroxide as a polymerization catalyst in the absence of a liquid reaction medium at pressures of from 200 to 2,000 lbs./in.² gage and at temperatures of from 105° to 135° C.

6. A method for producing vinylidene fluoride polymers which comprises subjecting a monomer consisting of at least 95 mole percent of vinylidene fluoride and not more than 5 mole percent of another ethylenically unsaturated comonomer to polymerization in the presence of ditertiary butyl peroxide as a polymerization catalyst at pressures ranging from about 200 to 2,000 lbs. per sq. in. and at temperatures of from 100° to 150° C.

7. A method for producing vinylidene fluoride polymers which comprises subjecting a monomer consisting of at least 95 mole percent of vinylidene fluoride and not more than 5 mole percent of another ethylenically unsaturated comonomer to polymerization in the presence of ditertiary butyl peroxide as a polymerization catalyst, in the presence of an aqueous reaction medium, and in the presence of a surfactant, at pressures ranging from about 200 to 2,000 lbs. per sq. in. and at temperatures of from 100° to 150° C.

8. A method in accordance with claim 7 in which said surfactant is a compound having a water solubilizing group and a hydrophobic group selected from the class consisting of highly fluorinated and highly fluorochlorinated groups having from 6 to 20 carbon atoms.

References Cited by the Examiner
UNITED STATES PATENTS

| | | | |
|---|---|---|---|
| 2,559,752 | 7/51 | Berry | 260—92.1 |
| 2,639,279 | 5/53 | Caldwell | 260—92.1 |
| 2,753,329 | 7/56 | Kroll | 260—92.1 |
| 2,816,833 | 12/57 | Larchar | 260—94.9 |
| 2,965,595 | 12/60 | Brinker et al. | 260—87.1 |
| 3,024,224 | 3/62 | Herbst | 260—92.1 |

OTHER REFERENCES

Schildknecht: Vinyl and Related Polymers, pp. 471–474, John Wiley (1952).

Milas: J.A.C.S., vol. 68, February 1946, pp. 205–8.

Chemical and Engineering News, vol. 25, No. 16, Apr. 2, 1947, p. 1145.

Chemical Industries, vol. 55, August 1944, p. 265.

WILLIAM H. SHORT, *Primary Examiner.*

MILTON STERMAN, H. N. BURSTEIN, *Examiners.*